Patented Feb. 19, 1952

2,586,486

UNITED STATES PATENT OFFICE 2,586,486

PREPARATION OF SPIRO[CYCLOHEXANE-1,1'-INDANONE-3']

Louis H. Schwartzman, Silver Spring, Md., assignor to Chemectron Corporation, Washington, D. C., a corporation of Delaware No Drawing. Application March 20, 1950, Serial No. 150,806

4 Claims. (Cl. 260—590)

This invention relates to methods of preparing ketones. More particularly, the invention is directed to methods of preparing an aromatic ketone from cyclohexanone and calcium carbide as starting materials.

The aromatic ketone prepared in accordance with the teachings of the present invention is a valuable intermediate for use in the preparation of a large number of analgesic compounds such as those described and claimed in applicant's copending applications Serial Numbers 150,807, 150,808, 150,809, and 150,810, filed on even date herewith.

By employing the methods of the present invention it is possible to obtain an aromatic ketone and, ultimately, to prepare the analgesic spirocyclohexylindanes and spirocyclohexylquinolines of the aforementioned applications, without the use of complicated processes or apparatus and by using as starting materials readily available and relatively inexpensive compounds, namely, cyclohexanone and calcium carbide.

The series of reactions through which cyclohexanone is converted into an aromatic ketone are illustrated as follows:

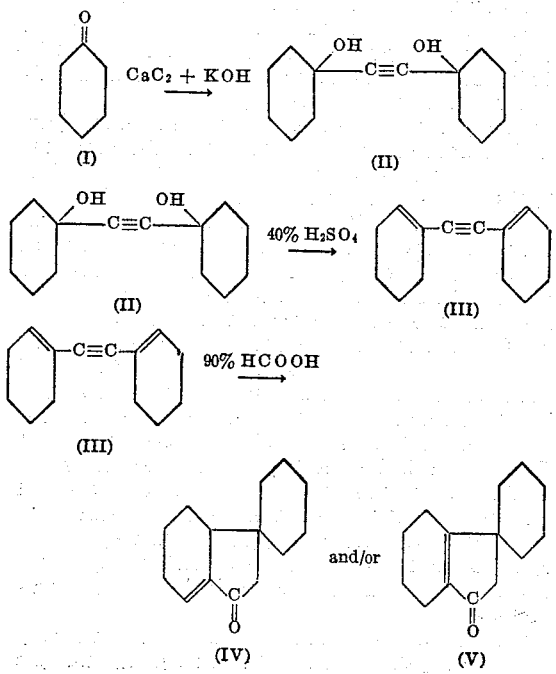

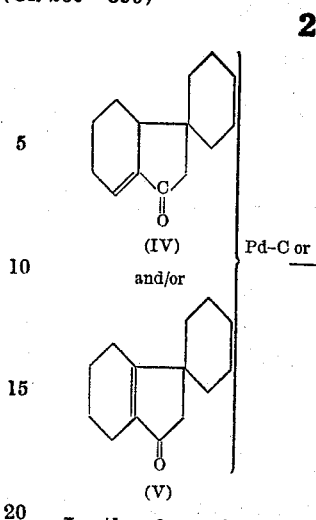

In the foregoing steps cyclohexanone (I) is converted to an acetylenic glycol (II), the glycol then being converted to a dieneyne (III), the dieneyne being converted to cyclic ketones (IV) and/or (V) and the cyclic ketone(s) being dehydrogenated in accordance with the teachings of the present invention to form the desired aromatic ketone (VI).

Heretofore the aromatic ketone (VI), illustrated above, has been prepared by starting with an aromatic ketone such as spiro[cyclohexane-1,1'-tetralone-4'] (a), converting this compound to the ortho dione (b) and subsequently converting the ortho dione to the desired spiro[cyclohexane-1,1'-indanone-3'] (VI) according to the following reaction:

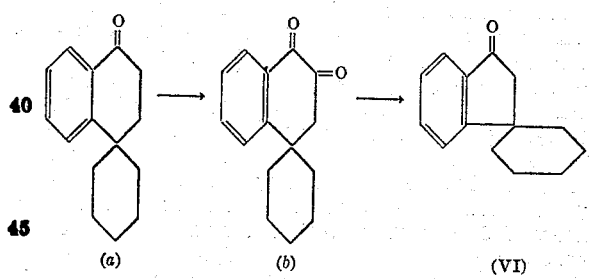

The foregoing procedure has the disadvantage of being difficult to carry out, providing relatively low yields and employing relatively expensive reagents. The present invention, to the contrary, makes it possible to start with cyclohexanone and calcium carbide, readily available and inexpensive starting materials, and to obtain easily therefrom high yields of the desired ketone.

The present invention, therefore, has as one of its objects the preparation of the aromatic ketone, spiro[cyclohexane-1,1'-indanone-3'] of the formula:

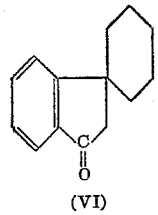

(VI)

from an α,β-unsaturated ketone such as spiro[cyclohexane-1,1'-Δ⁹'-tetrahydroindanone-3'] of the formula:

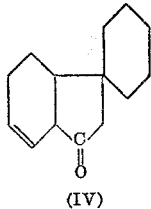

(IV)

or spiro[cyclohexane-1,1'-Δ⁸'-tetrahydroindanone-3'] of the formula:

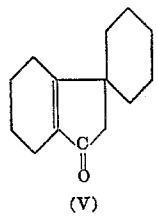

(V)

or a mixture thereof in the presence of a dehydrogenating agent.

More particularly the present invention has as one of its objects the conversion of the aforementioned α,β-unsaturated ketones into the aforementioned aromatic ketone by use of a dehydrogenating agent such as chloranil or palladium carried by an inert support such as carbon, charcoal, etc., whereby exceptionally high yields of the aromatic ketone are obtained.

By way of example, but without limiting the scope of the invention thereto, the methods of the present invention will be described in the examples set forth hereinafter.

*Example I*

Into a mixture of 382 grams of powdered calcium carbide, 240 grams of finely powdered potassium hydroxide, and 2500 ml. of anhydrous benzene, there is added dropwise with vigorous stirring over a period of two hours, 425 grams of cyclohexanone (I). The stirring is continued for four hours and the mixture is allowed to stand forty-eight hours at room temperature. The congealed mass is decomposed by the addition of 2 liters of 50% hydrochloric acid and the filtered, crude gray solid is air-dried. Upon crystallization from carbon tetrachloride, there is obtained 295 grams of the acetylenic glycol: 1,1'-ethynylene-biscyclohexanol (II).

64 grams of the acetylenic glycol (II) thus produced is refluxed for two and one-half hours with 300 ml. of 40% sulfuric acid. The organic layer, which was formed, is separated from the cooled mixture and the aqueous layer is extracted with ether. The combined organic layer and ether extracts is washed until neutral and the solvent is removed, whereby there may be recovered a crude dieneyne (III) of the formula:

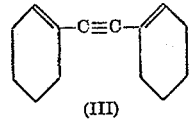

(III)

The crude dieneyne (III) thus obtained is refluxed for two and one-half hours with 450 ml. of 90% formic acid. The cooled reaction mixture is extracted with ether and the ether extract is washed with water until neutral and then dried over magnesium sulfate. The extract is filtered from the drying agent and after removal of the solvent under reduced pressure the residue is distilled. The yield of the cyclic ketone, spiro[cyclohexane-1,1'-Δ⁹'-tetrahydroindanone-3'] boiling at 120-130° at 2 mm. pressure is 38 grams. The ketonic material thus produced is essential as an intermediate for the preparation of an extremely large number of analgesic spirocyclohexanes, such as those disclosed in copending applications Serial Numbers 150,807, 150,808, 150,809, and 150,810. It is noted that by employing the step of reacting cyclohexanone (I) with calcium carbide and potassium hydroxide, and the subsequent steps, the acetylenic glycol (II) and ultimately the spirocyclohexylketonic material (IV and/or V) are obtained in favorable yields.

The cyclic ketonic material (IV and/or V), according to the teachings of the present invention, is aromatized in the following manner: 25 grams of the ketonic material is added to a mixture of 10 grams of a 5% palladium-charcoal catalyst and 20 ml. of p-cymene, or a similar solvent. Some of the requirements of the solvent are (1) not to poison the catalyst; (2) not to react with the ketonic material; (3) to remove any water bound by the catalyst or present in the mixture as an impurity during the distillation process described below; (4) to be miscible with the ketonic material, and (5) boil below 285° so that following removal of the water as described below the mixture can be made to boil at 285°-295°. Of the substances which accomplish this, p-cymene is found to be very good.

The mixture is heated and the solvent is partially removed by distillation until the temperature of the mixture reaches a range of 285° to 295° C. The mixture is heated under reflux conditions for an additional four hours at this temperature range. The mixture is cooled and the catalyst removed by filtration. Upon distillation of the filtrate under reduced pressure the aromatic ketone: spiro[cyclohexane-1,1'-indanone-3'] (VI) is obtained in a yield of 21.1 grams. The boiling point of this material is 110°-120° at 0.7 mm. and upon standing the ketone crystallizes. Upon sublimation under reduced pressure the solid ketone is obtained which melts at 53°-54°. This aromatic ketone (VI) is used as an intermediate to prepare one or more of the series of analgesic compositions mentioned hereinbefore, such compositions being, for example, of the spiranoindane, substituted spiranoindane, carbostyril and substituted carbostyril type of compounds.

The use of p-cymene or similar solvents may even be dispensed with in the foregoing example if the palladium-charcoal is previously freed of moisture.

*Example II*

In lieu of the palladium-charcoal employed in the foregoing example, chloranil may be used as the dehydrogenating agent. In such case spiro[cyclohexane - 1,1'-$\Delta^{9'}$-tetrahydroindanone-3'] and/or spiro[cyclohexane - 1,1'-$\Delta^{8'}$-tetrahydroindanone-3'], 36 grams is dissolved in 250 ml. of dry xylene or a similar solvent and 94 grams of chloranil added. The mixture is refluxed for eighteen hours and then cooled in an ice bath. The precipitated tetrachlorohydroquinone is filtered from the reaction mixture and the filtrate diluted with ether and extracted with dilute sodium hydroxide solution (10%). The resulting ether solution is dried and upon distillation 20 grams or 56% of spiro[cyclohexane-1,1'-indanone-3'] boiling at 139°–145° C. at 4 mm. is obtained.

Further modifications of the invention set forth above will be apparent to those skilled in the art and may be made without departing from the scope of the invention.

I claim:

1. The method of converting a compound selected from the group consisting of spiro[cyclohexane - 1,1'-$\Delta^{8'}$-tetrahydroindanone - 3'] and spiro[cyclohexane -1,1'-$\Delta^{9'}$-tetrahydroindanone-3'] into spiro[cyclohexane - 1,1'-indanone-3'] comprising treating at least one of said compounds with a dehydrogenating agent of the class consisting of palladium and chloranil, at a temperature above about 135° C.

2. The method set forth in claim 1, wherein the dehydrogenating agent is chloranil.

3. The method set forth in claim 1, wherein the dehydrogenating agent is palladium.

4. The method set forth in claim 1, wherein the dehydrogenating agent is palladium supported on an inert material.

LOUIS H. SCHWARTZMAN.

REFERENCES CITED

The following references are of record in the file of this patent:

Levitz et al.: Science, vol. 90, pp. 114–115 (1939).

Levitz et al.: J. Org. Chem., vol. 6, pp. 105–119 (1941).